(12) United States Patent
Goh et al.

(10) Patent No.: US 11,586,100 B2
(45) Date of Patent: Feb. 21, 2023

(54) CYLINDRICAL CAMERA THERMAL SHIELD

(71) Applicant: Dell Products L.P., Round Rock, TX (US)

(72) Inventors: Peng Lip Goh, Singapore (SG); Celia Law, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/325,508

(22) Filed: May 20, 2021

(65) Prior Publication Data

US 2022/0373869 A1    Nov. 24, 2022

(51) Int. Cl.
 *G03B 17/55* (2021.01)
 *H04M 1/02* (2006.01)
 *G03B 17/02* (2021.01)

(52) U.S. Cl.
 CPC ............ *G03B 17/55* (2013.01); *G03B 17/02* (2013.01); *H04M 1/0264* (2013.01)

(58) Field of Classification Search
 CPC ...... G03B 17/02; G03B 17/55; H04M 1/0264
 See application file for complete search history.

(56) References Cited

U.S. PATENT DOCUMENTS

| | | | |
|---|---|---|---|
| 5,811,790 A * | 9/1998 | Endo | H01L 31/02322 257/469 |
| 6,375,369 B1 * | 4/2002 | Schneider | G08B 13/19619 348/143 |
| D510,589 S | 10/2005 | Andre et al. | |
| 7,163,181 B2 | 1/2007 | Omps | |
| 7,337,497 B2 | 3/2008 | Seidler et al. | |
| 7,612,825 B2 | 11/2009 | Silverbrook | |
| D618,266 S | 6/2010 | Imaeda | |
| 8,118,499 B2 | 2/2012 | Tremblay | |
| 8,824,166 B2 | 9/2014 | Rohrbach | |

(Continued)

FOREIGN PATENT DOCUMENTS

| | | |
|---|---|---|
| CN | 204217039 U | 3/2015 |
| WO | 2011087301 A1 | 7/2011 |

OTHER PUBLICATIONS

Jellycomb W15 webcam downloaded from https://cdn.shopity.com/s/files/1/0053/8263/5610/files/WGBG-015_W15.pdf?v=1618477508 on May 2, 2022, in a Non-Final Office action dated Apr. 21, 2022 in related U.S. Appl. No. 17/325,501.

(Continued)

*Primary Examiner* — Amy R Hsu
(74) *Attorney, Agent, or Firm* — Zagorin Cave LLP; Robert W. Holland

(57) ABSTRACT

An information handling system peripheral camera is built by inserting a subassembly into a cylindrical housing and enclosing the subassembly with a bezel at the front and cover at the rear. The cylindrical housing is extruded with aluminum to have seams formed along the length of the interior. The seams provide alignment of the subassembly and are machined at the front and rear to form threads that accept screws to couple the bezel and rear cover to the cylindrical housing. To hide the screws, a back plate couples over the rear cover and an opaque treatment is applied to a circumference of a cover glass placed over the bezel.

20 Claims, 13 Drawing Sheets

(56) References Cited

U.S. PATENT DOCUMENTS

| | | |
|---|---|---|
| 9,169,962 B2 | 10/2015 | Wang et al. |
| D761,340 S | 7/2016 | Pacurariu et al. |
| D761,343 S | 7/2016 | Schmidt et al. |
| 9,611,978 B2 | 4/2017 | Manniche et al. |
| 9,631,767 B2 | 4/2017 | Kilgore et al. |
| 10,054,845 B1 | 8/2018 | Garcia et al. |
| 10,230,881 B2 | 3/2019 | Bull et al. |
| 10,502,247 B2 | 12/2019 | Bury |
| 10,520,127 B2 | 12/2019 | Dearsley et al. |
| 10,718,996 B2 | 7/2020 | Ramones et al. |
| 10,724,681 B2 | 7/2020 | Gearing et al. |
| 10,831,093 B1* | 11/2020 | Lablans ............... G03B 30/00 |
| 2004/0257432 A1 | 12/2004 | Girish et al. |
| 2007/0046031 A1 | 3/2007 | Goldenberg et al. |
| 2009/0101768 A1 | 4/2009 | Wert |
| 2010/0021155 A1 | 1/2010 | Orzeck et al. |
| 2010/0237206 A1 | 9/2010 | Barker |
| 2013/0163197 A1 | 6/2013 | Mack et al. |
| 2015/0201530 A1* | 7/2015 | Liu ..................... G06F 1/203 362/373 |
| 2017/0315596 A1 | 11/2017 | Torres et al. |
| 2018/0020193 A1* | 1/2018 | Blum ................. G06F 1/1686 |
| 2020/0183255 A1 | 6/2020 | Gwalani |
| 2020/0296272 A1* | 9/2020 | Kramarov ............. G03B 17/55 |
| 2020/0392759 A1 | 12/2020 | Morrison et al. |
| 2021/0112217 A1 | 4/2021 | Jones et al. |

OTHER PUBLICATIONS

Pocketlint, "Review of V5 camera," at https://www.pocket-ling.com/laptops/reviews/71475-liquid-digital-solutions-agent-v5-webcam dated Nov. 3, 2009 (Year 2009).

Goodgearguide "Goodgearguide.com.au review of V5 camera," at https://www.goodgearguide.com.au/review/liquid_digital_solutoins/agent_v5/317033, dated Feb. 9, 2009 (Year 2009).

Logitech, "Setting Up & Using a Logitech Meetup," https://support.apu.edu/hc/en-us/articles/360011828914-Setting-Up-Using-a-Logitech-MeetUp dated Feb. 10, 2020 (Year 2020).

Minimally Minimal, "Apple iSight," at http://www.minimallyminimal.com/blog/apple-isight, Mar. 9, 2014, downloaded Apr. 5, 2022, 27 pages.

Wikipedia, "iSight," downloaded from http://en.wikipedia.org/wiki/ISight on May 20, 2021, 4 pages.

\* cited by examiner

CYLINDRICAL CAMERA THERMAL SHIELD

CROSS REFERENCE TO RELATED APPLICATIONS

U.S. patent application Ser. No. 17/325,494, filed May 20, 2021, entitled "Camera Stand with Integrated Tilt Hinge" by inventors Peng Lip Goh, Celia Law, and Deeder M. Aurongzeb, describes exemplary methods and systems and is incorporated by reference in its entirety.

U.S. patent application Ser. No. 17/325,503, filed May 20, 2021, entitled "Camera and Mount" by inventors Celia Law, Chun Long Goh, Peng Lip Goh, Deeder M. Aurongzeb, and Wai Mun Lee, describes exemplary methods and systems and is incorporated by reference in its entirety.

U.S. patent application Ser. No. 17/325,501, filed May 20, 2021, entitled "Camera and Lens Cap" by inventors Celia Law, Chun Long Goh, Peng Lip Goh, Deeder M. Aurongzeb, and Wai Mun Lee, describes exemplary methods and systems and is incorporated by reference in its entirety.

U.S. patent application Ser. No. 17/325,518, filed May 20, 2021, entitled "Cylindrical Camera and Integrated Support" by inventors Peng Lip Goh, Celia Law, and Deeder M. Aurongzeb, describes exemplary methods and systems and is incorporated by reference in its entirety.

BACKGROUND OF THE INVENTION

Field of the Invention

The present invention relates in general to the information handling system cameras, and more particularly to an information handling system cylindrical camera thermal shield.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with peripheral devices, such as keyboards, mice and cameras. Cameras are typically used to support videoconferences in which visual images captured by cameras are exchanged so that end users can communicate while viewing each other. Typically, videoconferences are performed with cameras that have relatively low resolution. The use of low resolution is driven in part by the amount of bandwidth consumed by communication of video information. In addition, low resolution is driven by the footprint of typical Web cameras, which generally do not have the size to support high quality lenses. For example, cameras integrated in portable information handling systems tend to have a restricted focal length due to the thickness of typical portable information handling system housings. Peripheral Web cameras typically have a larger footprint so that higher quality lenses may be included that capture higher resolution visual images than integrated cameras. Generally, even with larger housing footprints, Web cameras tend to limit resolution to High Definition visual images as Ultra High Definition or 4K cameras and have large bandwidth demands.

Recently, enterprises have experienced an increased reliance on videoconferences to interact internally between employees and externally with customers and vendors. Although lower resolution Web cameras are sufficient for many daily uses, in many situations, higher quality video images are desired. For instance, in conferences that involve senior executives or high government officials, higher resolution video images are generally desired. Often, such high level conferences are done from large conference rooms and involve a number of participants. Generally, high resolution cameras with high quality lenses offer a number of advantages in such scenarios. One advantage is that greater focal length will allow one camera to provide high quality video images at different ranges through zoom functionality. Another advantage is that higher resolution offers greater flexibility for digital zoom, pan and tilt functions, such as by cropping an image to capture a participant with a close-up view. When a camera provides higher resolution visual images, a number of additional integrated functions may be provided at the camera, such as artificial intelligence analysis that aids with facial recognition and gesture inputs. For example, processing resources added to the camera monitor visual information for desired attributes that are reported to the information handling system, such as an end user's identity.

One difficulty with including higher resolution capability in a peripheral Web camera is that additional interior room generally needed for higher resolution and greater integrated intelligence can result in awkward form factors with unsatisfactory aesthetics, particularly when used in profile video conferences. Assembly of the camera to include high resolution lenses and additional processing components can result in a complex internal arrangement that does not readily fit into smaller form factors. For instance, an external housing of the camera tends to include screws and other assembly mechanisms that are visible to the end user. Another difficulty is that processing components included to provide artificial intelligence functions tend to generate heat that does not dissipate readily from a camera housing having a minimal footprint. High internal temperatures may result in a housing skin temperature that limits end user interactions, such as to adjust the camera line of sight or move the camera location.

SUMMARY OF THE INVENTION

Therefore, a need has arisen for a system and method which integrates a peripheral camera in a cylindrical housing.

A further need exists for a system and method that manages thermal energy generated within a cylindrical camera housing.

In accordance with the present invention, a system and method are provided which substantially reduce the disadvantages and problems associated with previous methods and systems for assembly of a peripheral camera in a housing. A cylindrical housing extruded from aluminum or other material accepts a subassembly slid into an interior that contains a camera module and processing resources in a secure manner. Coupling a bezel at a front face and rear cover at a rear face captures the subassembly in the cylindrical housing for a robust assembly with a minimalist footprint and appearance. Wrapping the subassembly within the cylindrical housing with a graphene sheet creates a thermal barrier to reduce transfer of excess thermal energy from processing resources within the housing to the housing skin.

More specifically, an information handling system having a processor and memory interfaces with a peripheral camera that captures visual images to support video conferences. The peripheral camera is assembled into a cylindrical housing by coupling a camera module to a subassembly sized to slide into the cylindrical housing. For example, the cylindrical housing is extruded aluminum having open front and rear faces and three seams that run along the length of the housing. At the front and rear faces, the seams are machined to form threads to couple to screws. A bezel couples to the front face with screws engaged in the threads and covered from sight by an opaque treatment of a cover glass outer circumference coupled over the bezel. A rear cover couples to the rear face with screws engaged in the thread and covered from sight by a back plate that snaps into position. The subassembly is built from an upper frame and lower frame that snap together to capture the camera module at a front side with snaps and snap connectors integrated in the upper frame and lower frame. A processing resource couples to the upper frame, such as processor that interfaces with the camera to process visual images for facial recognition and artificial intelligence functions. A communications processing resource, such as a USB Type C hub couples to the lower frame and interfaces with a communications port disposed at a bottom of the cylindrical housing. Ribs formed in the lower frame engage against the cylindrical housing interior to provide support to hold the camera module in position. A graphene sheet wraps around the subassembly in a cylinder shape that provides a barrier to reduce transfer of thermal energy from the processing resource to the cylindrical housing. For example, the graphene sheet couples to the subassembly so that an air gap is maintained between the outer surface of the graphene sheet and the cylindrical housing. Alternatively, the graphene sheet may interface with a portion of the cylindrical housing having a reduced exposure to an end user, such as the rear cover, so that excess thermal energy is rejected from within the cylindrical housing.

The present invention provides a number of important technical advantages. One example of an important technical advantage is that a peripheral camera integrates in a cylindrical housing without exposing coupling devices used to assemble the camera. An elegant appearance is provided with ease of assembly for high yield production throughput with high quality, durability and reliability. The cylindrical housing assembles through front and rear openings by inserting a subassembly into the cylindrical housing interior aligned by an internal structure and coupled to the housing a coupling points located with the housing. A camera module and various processing components are assembled on a subassembly support that mounts in the cylindrical housing interior reinforced by ribs to provide a rigid and robust internal structure that protects the camera module and processing components. In the event of a system failure, the internal subsystem is slid out from the cylindrical housing interior to provide ready access to the camera module and processing components for repair. A graphene shield disposed around the subassembly aids in thermal rejection and helps to avoid excessive cylindrical housing skin temperatures. The cylindrical housing and internal subsystem offer an aesthetically pleasing and simple to use peripheral camera with optimal performance for high definition visual image capture in a minimal footprint having well-moderated thermal exterior conditions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system peripheral camera housing of extruded aluminum supports a camera module and processing resources with a subassembly slid into the housing interior and wrapped in a graphene sheet for thermal management. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
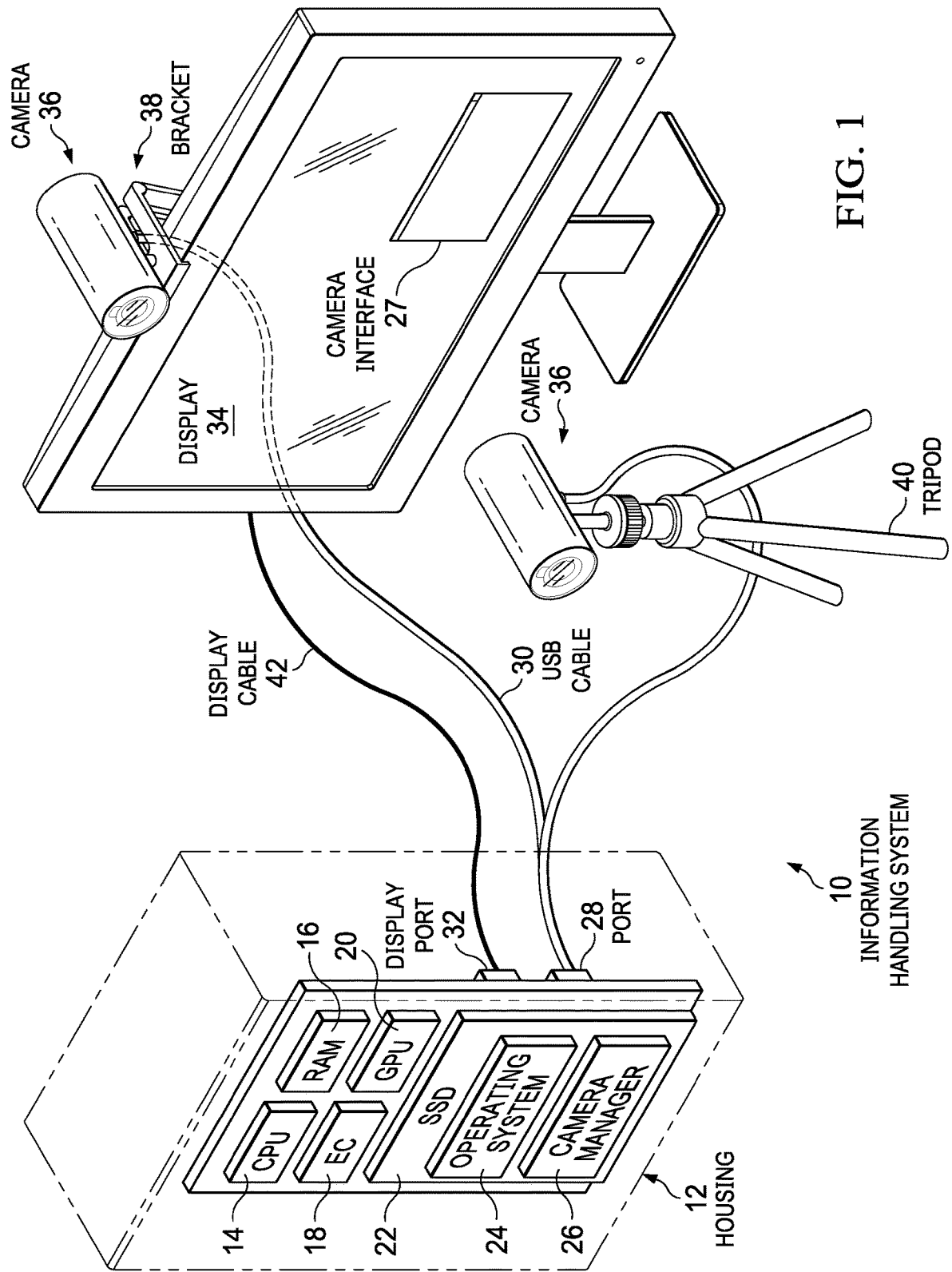
FIG. 1 depicts a block diagram of an information handling system interfaced with a peripheral camera that supports videoconferencing.

Referring now to FIG. 1, a block diagram depicts an information handling system 10 interfaced with a peripheral camera 36 that supports videoconferencing. In the example embodiment, information handling system 10 processes information with processing components disposed in a housing 12. For example, a central processing unit (CPU) 14 executes instructions that process information with the instructions and information stored in a random access memory (RAM) 16. An embedded controller 18 manages physical operating conditions within housing 12, such as application of power and maintaining thermal constraints, and also manages interactions with peripheral devices, such as a keyboard and mouse. A graphics processing unit (GPU) 20 interfaces with CPU 14 and further processes the information to generate visual images, such as by generating pixel values that define pixel colors for presentation at display 34. A solid state drive (SSD) 22 provides non-transitory memory, such as flash, that stores information during system power down states. For example, the instructions may include an operating system 24 stored in SSD 22 and retrieved to RAM 16 with boot code executed on embedded controller 18 at system power up.

GPU 20 interfaces through a display port 32 and display cable 42 with a display 34 that presents information as visual images, such as by scanning pixel values to a display panel having rows and columns of pixels. In the example embodiment, a first peripheral camera 36 is illustrated in two different positions relative to display 34. A bracket 38 couples camera 36 to an upper side of display 34 to capture visual images of an end user viewing display 34. A second peripheral camera 36 rests on a tripod 40 to capture visual images of an end user viewing the display from a location in between the end user and the display. Multiple viewing locations for camera 36 provides an end user with increased flexibility regarding the quality of a visual image captured by camera 34. As is described below in greater detail, camera 36 may selectively detach and attach from each of bracket 38 and tripod 40. Camera 36 captures visual images and communicates the visual images through a USB cable 30 and to a USB port 28 for use by information handling system 10, such as to support a videoconference. In the example embodiment, a camera manager 26, such as driver of operating system 24, provides a camera interface 27 for presentation at display 34 to manage camera settings and present visual images captured by camera 36.

Figure 2:
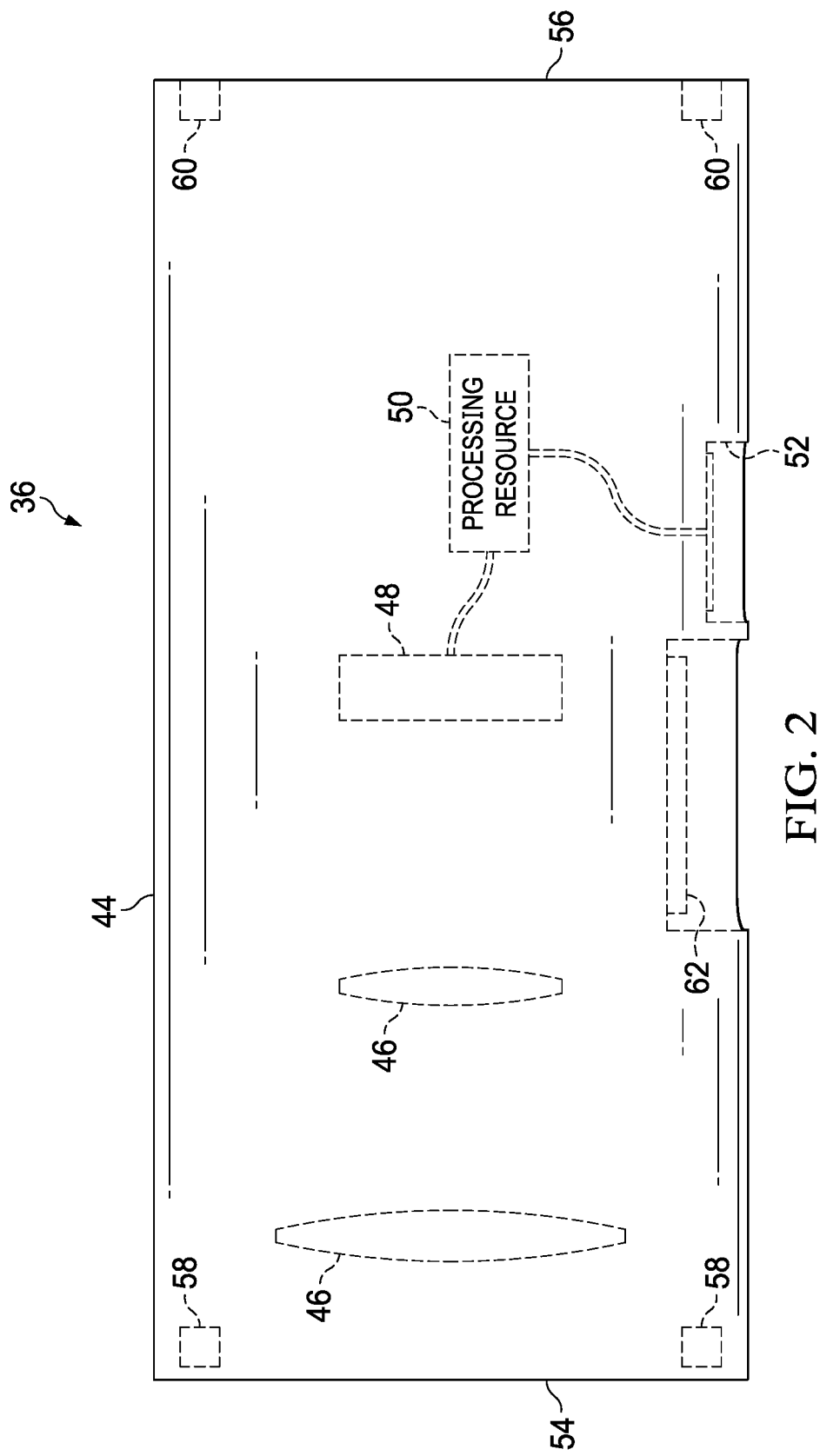
FIG. 2 depicts a side cutaway view of a camera configured to couple to a stand and lens cap with integrated magnets.

Referring now to FIG. 2, a side cutaway view depicts camera 36 configured to couple to a stand and lens cap with integrated magnets. In the example embodiment, camera 36 houses lenses 46 in a cylindrical housing 44 to capture visual images with a light sensor 48. A processing resource 50, such as a microcontroller, interfaces with light sensor 48 to communicate captured visual images out of camera 36 through a USB port 52 integrated in an opening at a bottom side of cylindrical housing 44. A lens cover glass 54 at a front face of cylindrical housing 44 protects lens 46 from contaminants while providing a transparent material through which light passes for capture through lens 46 at light sensor 48. In the example embodiment, a pair of lens cap magnets 58 are disposed proximate lens cover glass 54 to attract ferromagnetic material integrated in a lens cap so that the lens cap covers lens cover glass 54. At a rear face 56 of cylindrical housing 44, lens cap storage magnets 60 are disposed to attract the lens cap as a place of storage when camera 36 is active capturing visual images. Proximate USB port 52, an opening in cylindrical housing 44 integrates a stand magnet 62 that uses magnetic attraction to couple to a stand of bracket 38 or tripod 40, as set forth in greater detail below. The cylindrical shape of the housing, including its length, provides an efficient layout for optical image capture so that a UHD 4K light sensor can be used to capture high quality visual images. Greater detail regarding magnetic coupling of the camera to a stand and lens cap is provided in U.S. patent application Ser. No. 12/487,701, which is incorporated herein as if fully set forth.

Figure 3A:
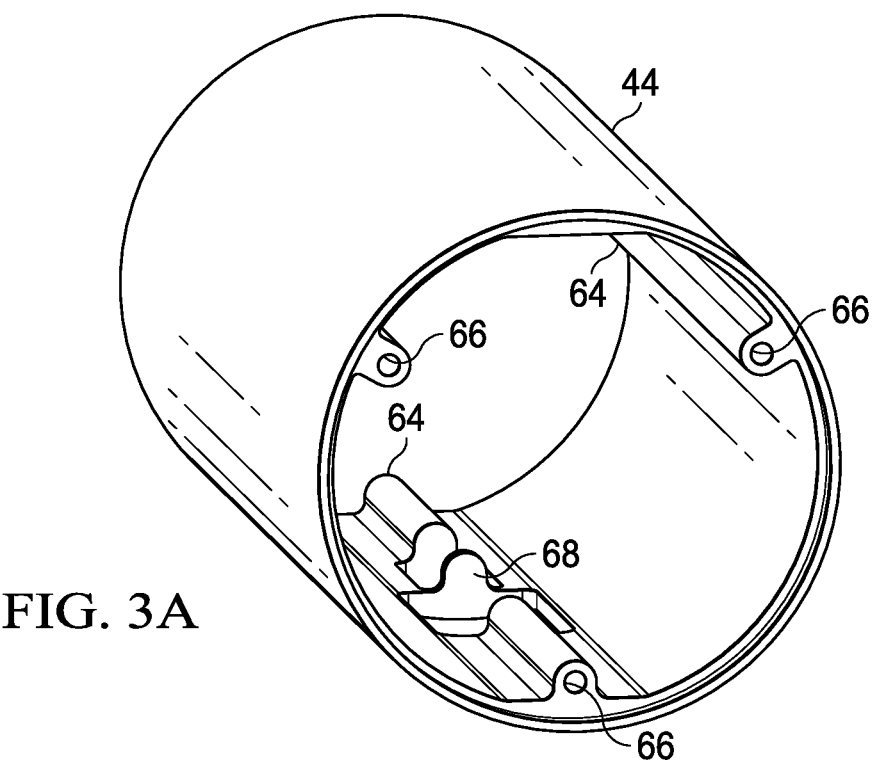
FIGS. 3A, 3B, 3C, 3D, 3E, 3F, 3G and 3H depict the peripheral camera cylindrical housing and subassembly.
Figure 3B:
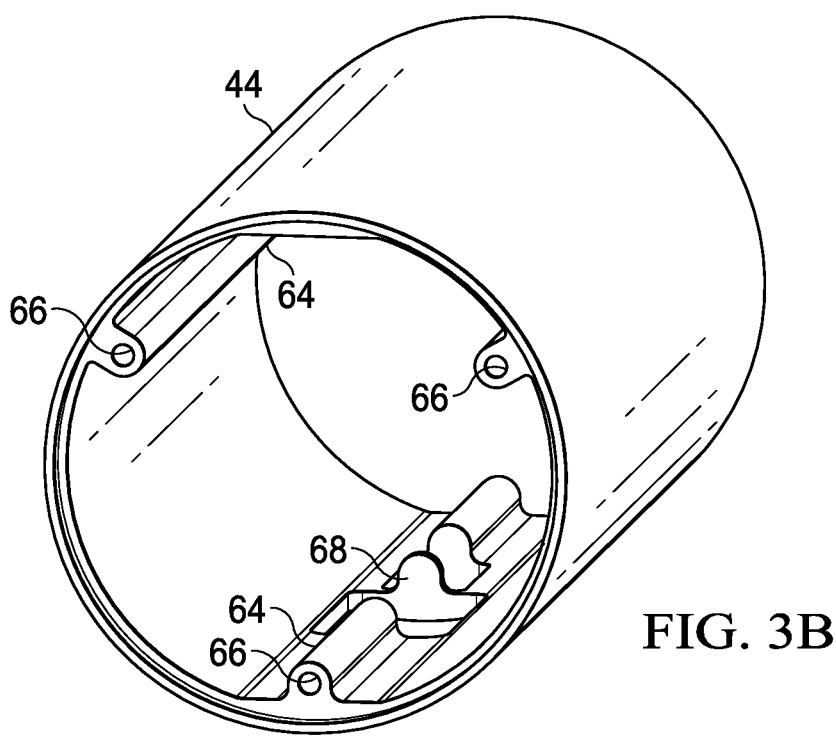
Figure 3C:
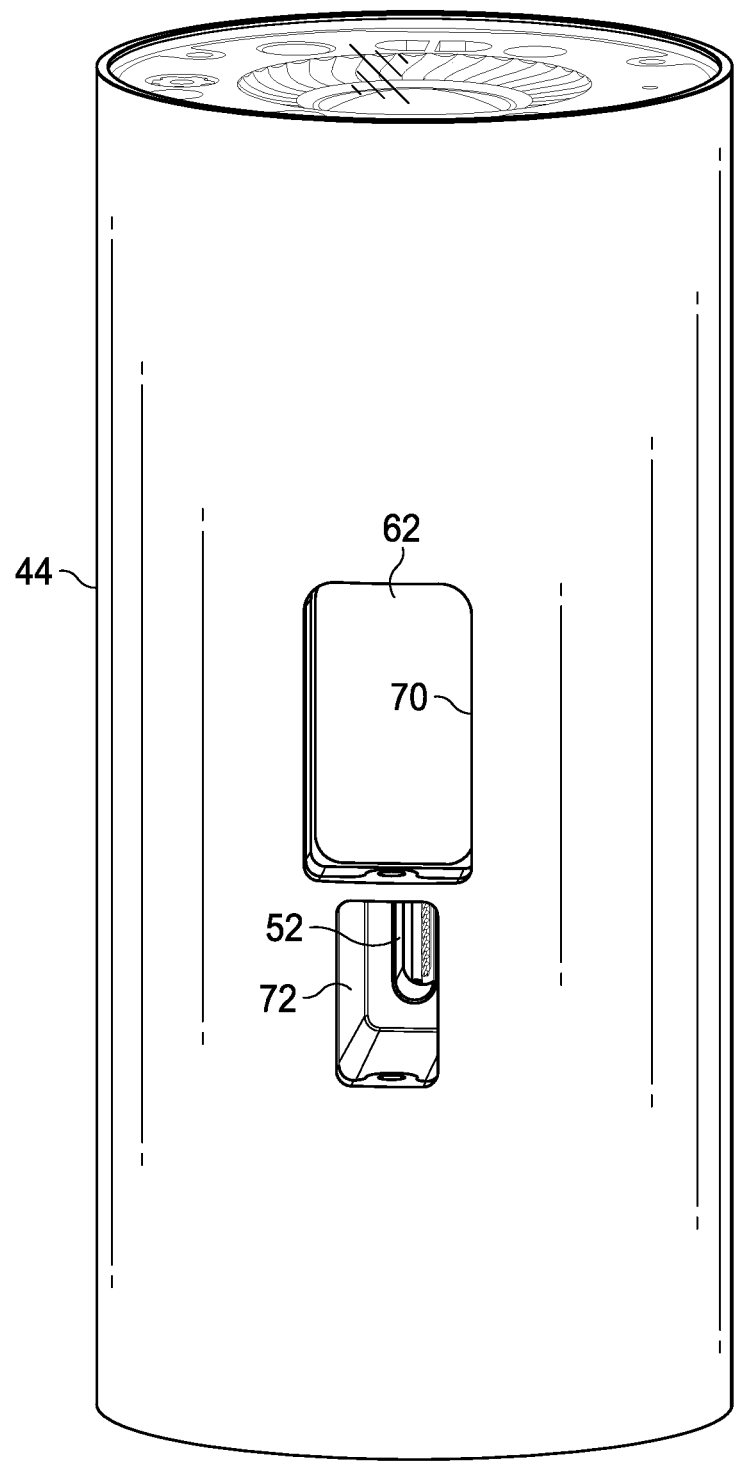
Figure 3D:
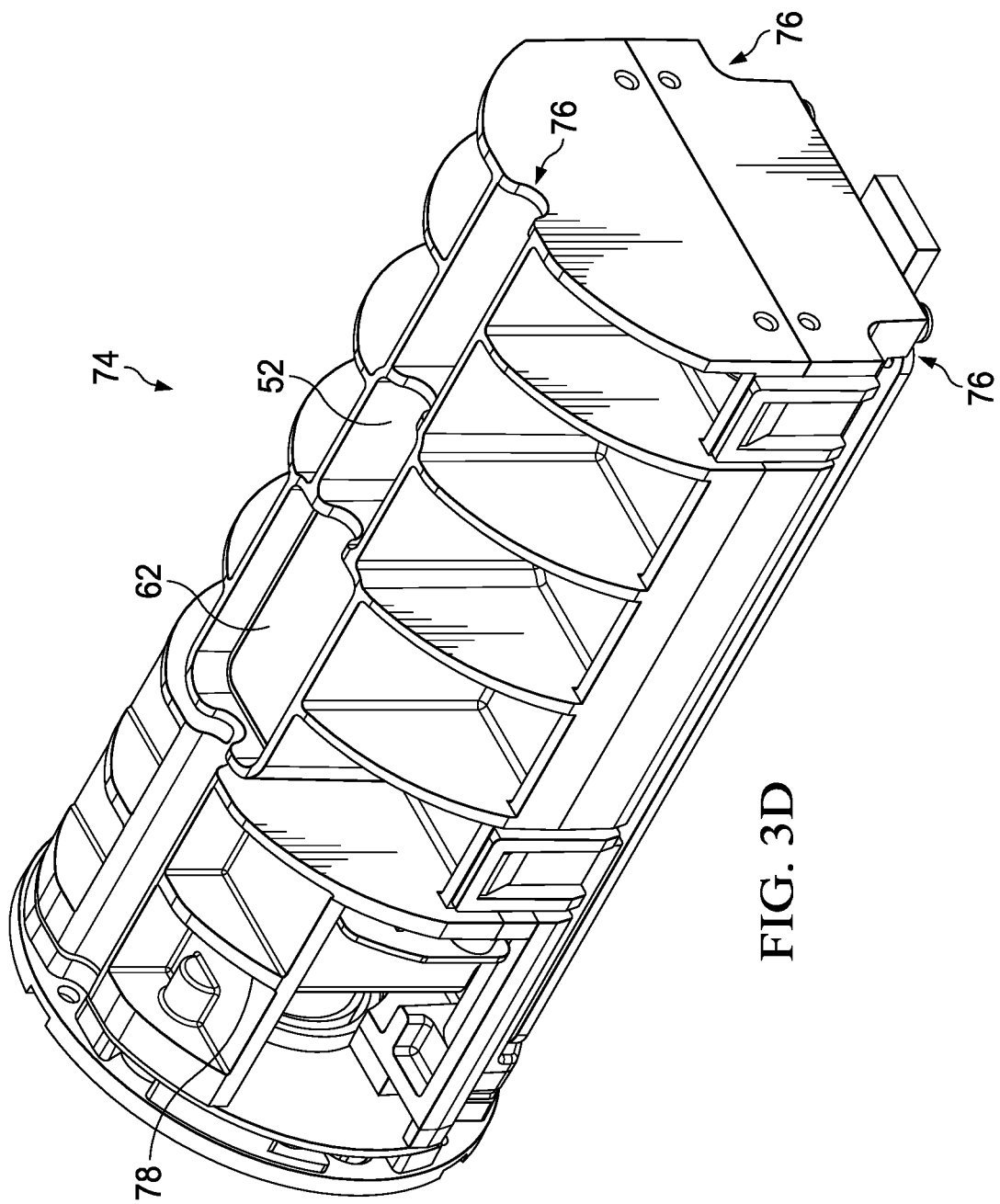

Referring now to FIGS. 3A, 3B, 3C, 3D, 3E, 3F, 3G and 3H, the peripheral camera cylindrical housing 44 and subassembly 74 are depicted. FIG. 3A depicts cylindrical housing 44, which is formed by extrusion of aluminum or other suitable material. The extrusion of aluminum is performed through a mold that defines 3 seams 64 along the full length of the interior surface of cylindrical housing 44. After extrusion is completed to output a cylinder with open front and rear faces, each end of seam 64 at the front and rear faces is machined to form threads 66 that accept screws. FIG. 3A depicts the front face of cylindrical housing 44 with threads 66 formed at each of three seams 64, and FIG. 3B depicts the rear face of cylindrical housing 44 with threads 66 formed at the opposing ends of seams 64. The bottom side of cylindrical housing 44 has a flat surface orientation datum 68 machined through seam 64, such as with a CNC operation. As is illustrated by FIG. 3C, orientation datum 68 define a separation between a stand member opening 70 and a communication port opening 72. FIG. 3C includes for illustration purposes magnet 62 disposed in stand member opening 70 and a communication port 52 disposed in communication port opening 72. In the example embodiment, magnet 62 and communication port 52 couple to a subassembly 74 depicted by FIG. 3D and having a guide 76 to align subassembly 74 at the orientation datum 68. Subassembly 74 is depicted from a bottom view with guide 76 positioned to align subassembly 74 when slid into cylindrical housing 44. Subassembly 74 has a cylindrical outer shape with ribs 78 sized to engage against the inner wall of cylindrical housing 44 to hold subassembly 74 in a substantially fixed position and orientation, as defined by the interaction of three guides 76 with three seams 64 of cylindrical housing 44.

Figure 3E:
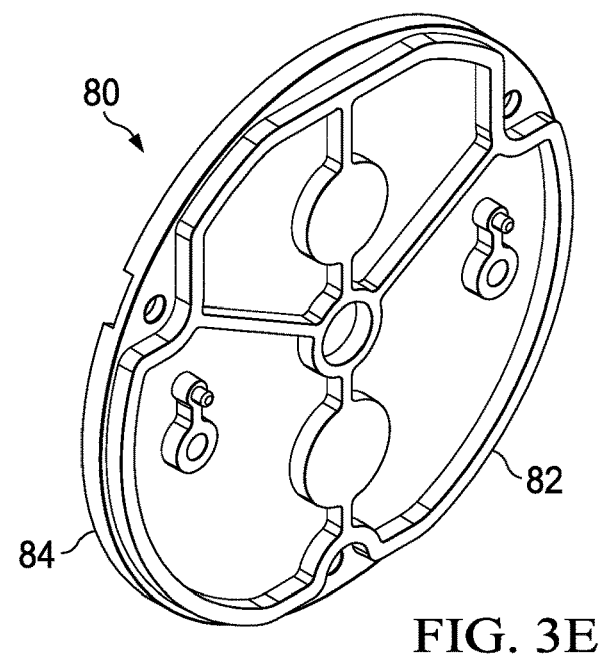
Figure 3F:
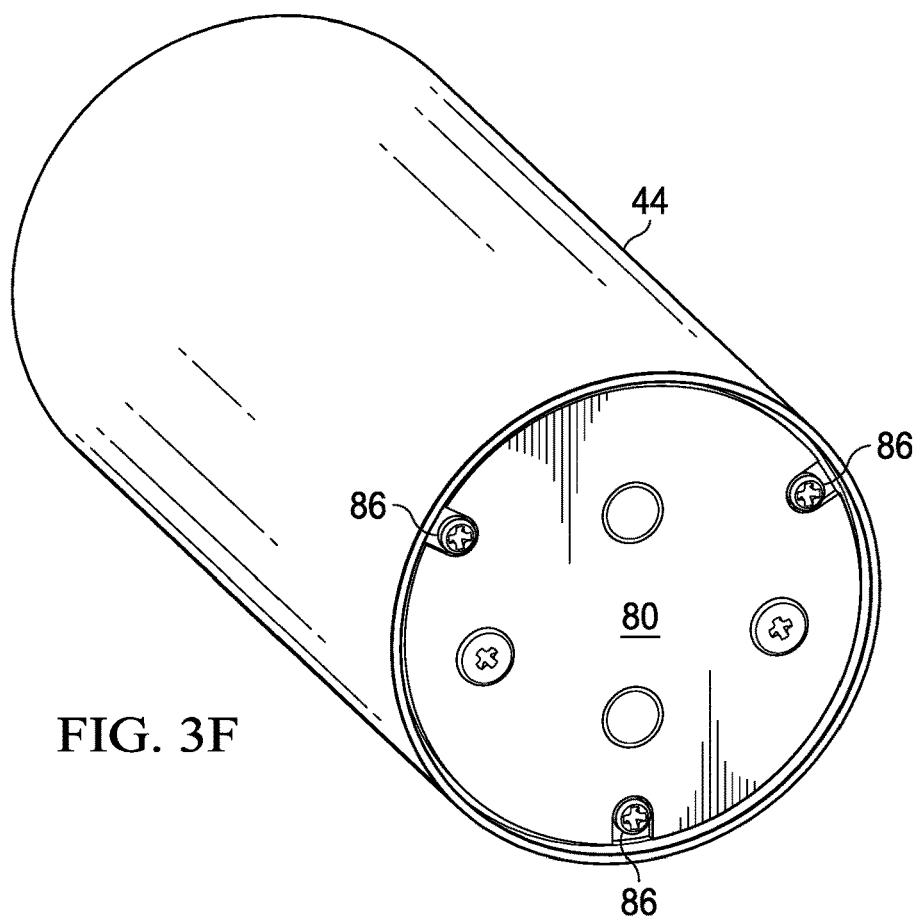
Figure 3G:
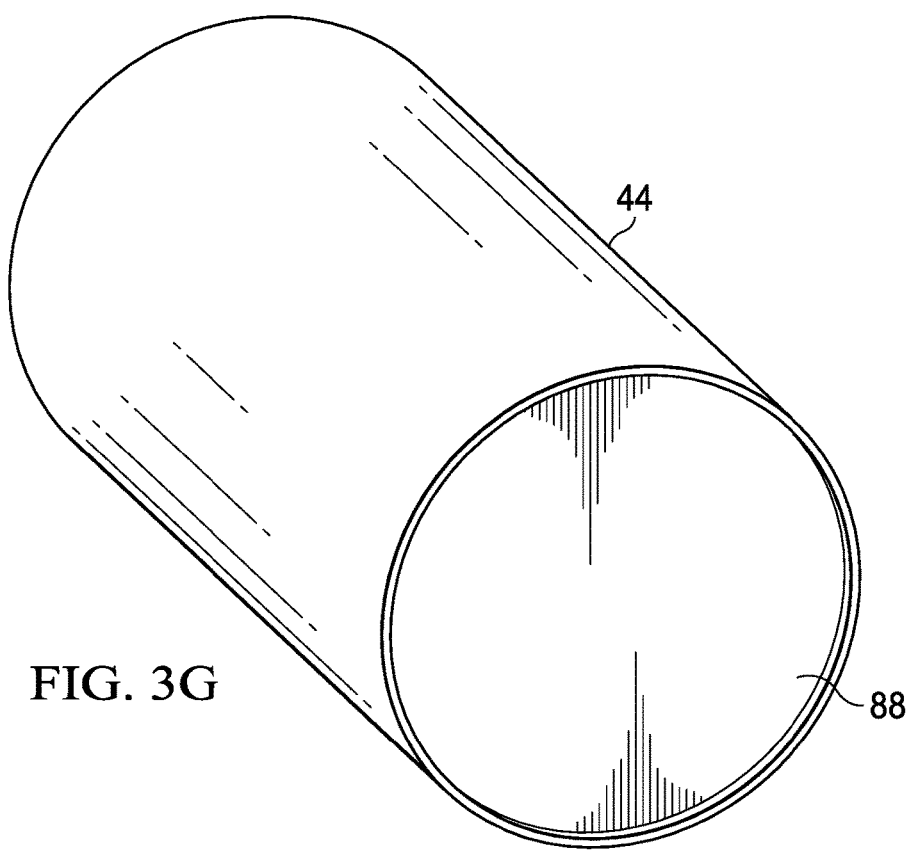
Figure 3H:
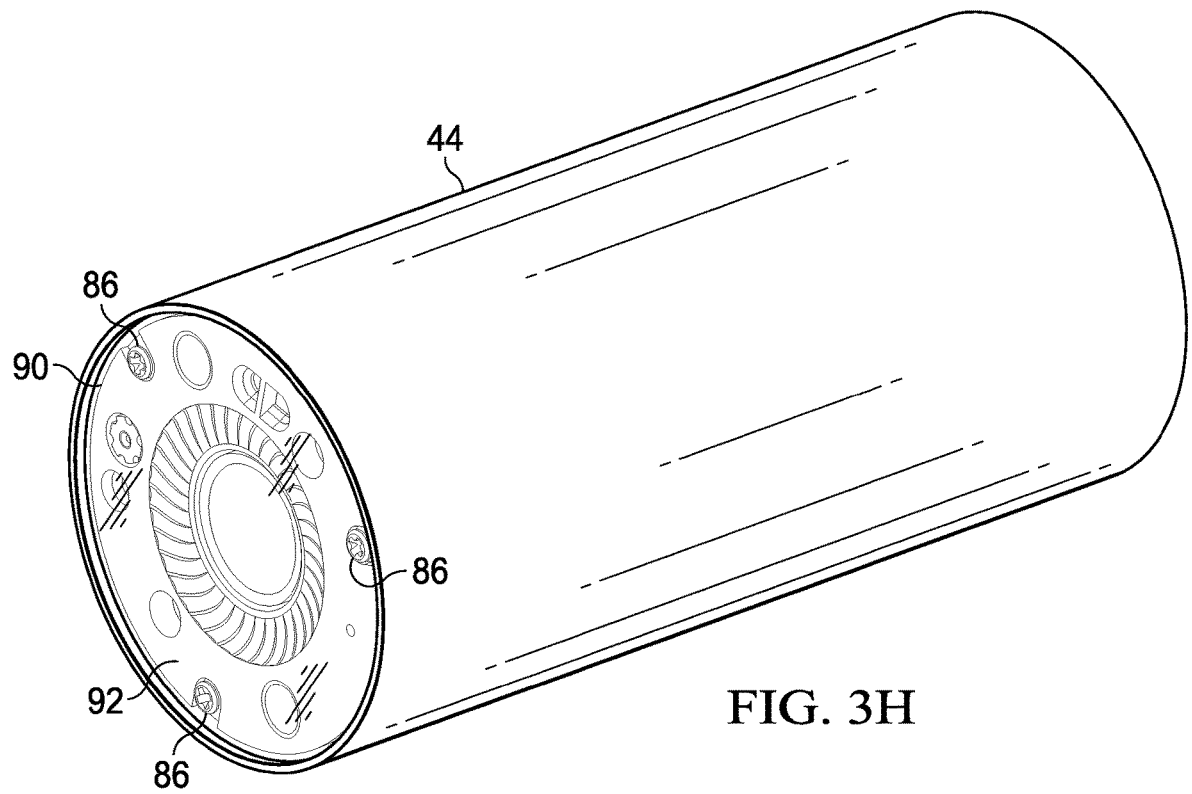

When fully assembled as an electronic device enclosure, cylindrical housing 44 has subassembly 74 captured in the interior and enclosed at the front and rear faces. FIG. 3E depicts an inner side of a rear cover 80 that couples to the rear face of the cylindrical housing. In the example embodiment, an inner plastic portion 84 couples by adhesive or other means with an outer aluminum portion 82 having three openings aligned with the seam threads 66 so that screws 86 can insert into the openings at the outer side of rear cover 80 to couple rear cover 80 to cylindrical housing 44, as is depicted by FIG. 3F. FIG. 3G depicts an aluminum back plate 88 that snaps into place over rear cover 80 to hide screws 86 and provide a clean appearance to the assembled electronic device. As is described in greater detail below, one example embodiment transfers excess thermal energy generated by processing components within cylindrical housing 44 to rear cover 80 so that the excess thermal energy is rejected from the rear face rather than the cylindrical surface. FIG. 3H depicts a front face view of cylindrical housing 44 having a bezel 90 couple over the front opening. Bezel 90 couples to threads 66 at the front face with screws 86 and includes an inner portion having an opening through which the camera can capture visual images. A cover glass 92 couples over bezel 90 and has an opaque outer circumference that hides screws 86 so that the full camera assembly appears to have no coupling devices. Although the example embodiment houses a camera, other types of electronic devices may be housed in alternative embodiments.

Figure 4A:
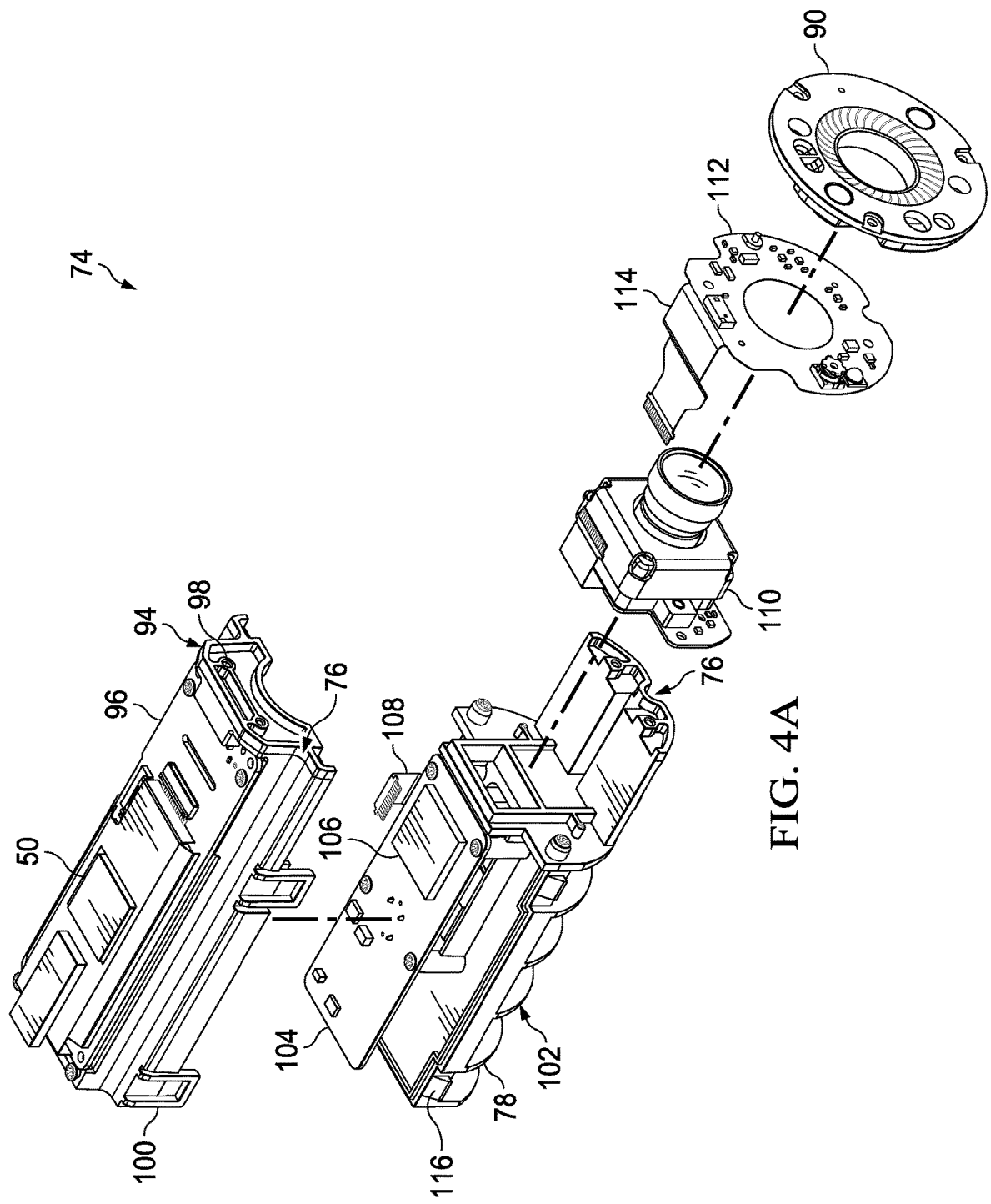
FIGS. 4A and 4B depict the peripheral camera subassembly supporting a camera module and processing resources.
Figure 4B:
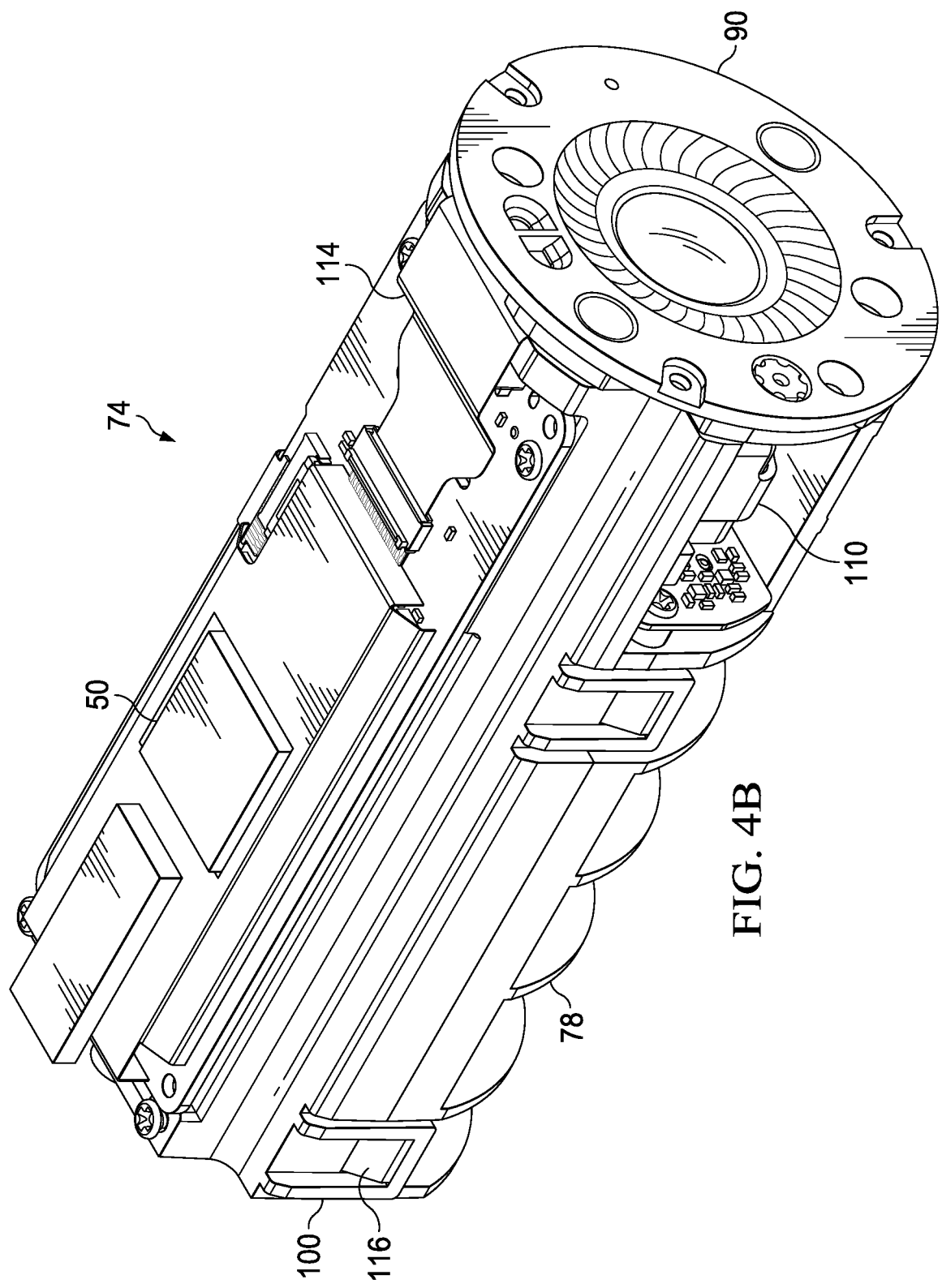

Referring now to FIGS. 4A and 4B, the peripheral camera subassembly 74 is depicted supporting a camera module 110 and processing resources 50. In the example embodiment, subassembly 74 is assembled from a lower frame 102 that couples to an upper frame 94 by integrated snaps 100 aligned to couple to snap couplers 116. Upper frame 94 supports a circuit board 96 at an upper surface that interfaces with processing resource 50. Processing resource 50 is, for example, a processor having artificial intelligence capability to process visual images captured by camera module 110, such as to perform facial recognition. A slot 98 formed in upper frame 94 provides a path for cable 114 of a sensor assembly 112 to pass to circuit board 96 for use of sensor inputs by processing resource 50. Lower frame 102 includes a second circuit board 104 coupled to an upper surface and including a communication hub processing resource 106, such as to support an interface with a USB Type C communication port disposed at the bottom of cylindrical housing 44. A camera module cable 108 provides communication of camera visual images from camera module 110 to circuit board 96. In the example embodiment, pins on the upper circuit board 96 bottom surface couple to a pin interface of the second circuit board 104 when upper frame 94 couples over top of lower frame 102. FIG. 4B depicts the upper frame 94 coupled to the lower frame 102 by engagement of snaps 100 to snap connectors 116. Bezel 90 is depicted aligned in front of camera module 110 with the camera arranged to capture visual images through the central opening. The coupling of upper frame 94 to lower frame 102 captures and secure camera module 110 in place.

Figure 5:
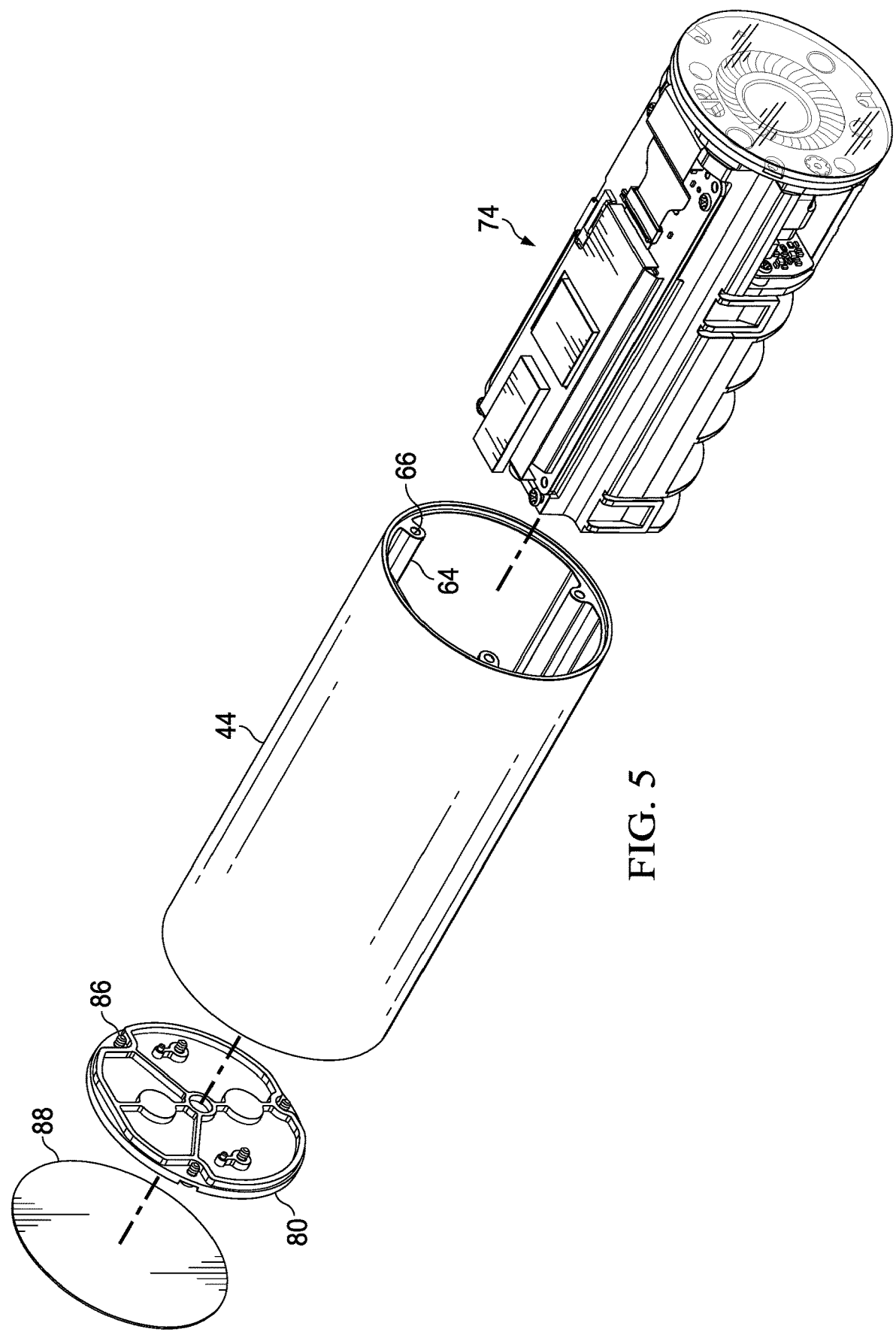
FIG. 5 depicts the peripheral camera cylindrical housing aligned for insertion with the subassembly.

Referring now to FIG. 5, the peripheral camera cylindrical housing 44 is depicted aligned for insertion with the subassembly 74. Guides 76 of subassembly 74 engage seams 64 of the interior or cylindrical housing 44 to provide an alignment having the communications port and magnet integrated in subassembly 74 with openings formed in the bottom of cylindrical housing 44. Once subassembly 74 fully inserts, such as is defined by the orientation datum within the interior of cylindrical housing 44, rear cover 80 couples to threads 66 of seams 64 with screws 86 to capture the subassembly in place. Back plate 88 snaps over rear cover 80 to hide the coupling screws. Similarly, bezel 90 and cover glass 92 capture subassembly 74 within the interior of cylindrical housing 44 as described above.

Figure 6:
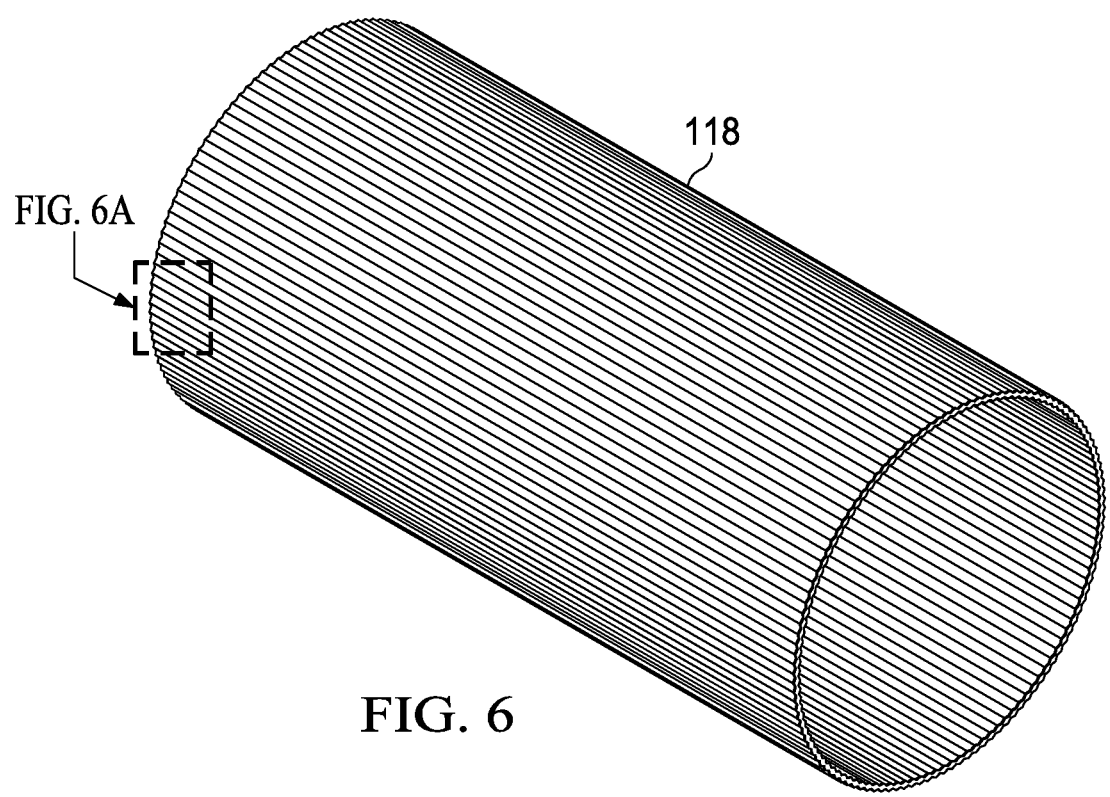
FIGS. 6, 6A, 6B, 6C, and 6D depict a graphene sheet wrapped around the subassembly for insertion into the cylindrical housing as a thermal barrier.
Figure 6A:
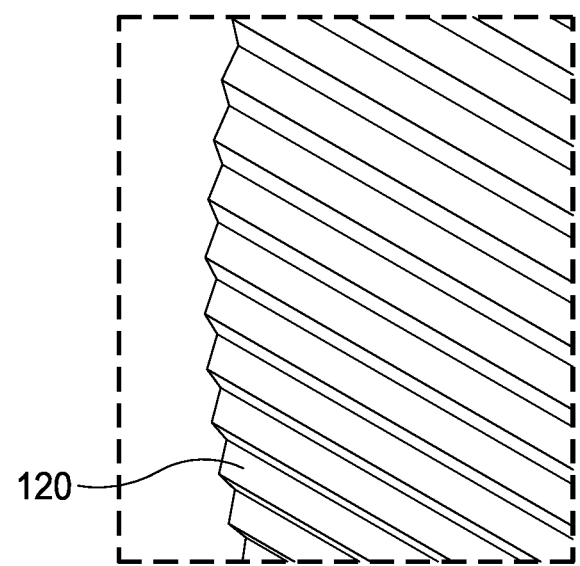

Referring now to FIGS. 6, 6A, 6B, 6C, and 6D, a graphene sheet 118 is depicted wrapped around the subassembly 74 for insertion into the cylindrical housing as a thermal barrier. Processing resources disposed in an aluminum housing can generate sufficient thermal energy as a byproduct of executing instructions that the skin of the housing heats to a range that can result in end user discomfort. FIG. 6A depicts a graphene sheet wrapped in a cylinder shape sized to slide into the cylindrical housing. The detailed view depicts a corrugated pattern 120 formed in graphene sheet 118 that effectively increases the surface area of the graphene sheet. Graphene sheet 118 is layers of graphene that have a high thermal conductivity along the length of the sheet and a lower thermal conductivity normal to the length of the graphene sheet. The effect of the thermal conductivity characteristics of graphene is that excess thermal energy generated in an interior of the cylinder shape is managed with reduced conductivity through the graphene material. Excess thermal energy absorbed by the graphene material from the cylinder interior is spread along the length of the graphene material where thermal conductivity is greatest and thereby thermal differential and transfer to the aluminum cylindrical housing is reduced. In one example embodiment, the surface area of the inside of the cylinder shape of graphene sheet 118 is corrugated to increase the surface area that can absorb thermal energy from the interior area while a flat out surface reduces the surface area of graphene that can transfer thermal energy to the cylindrical housing. In one embodiment, graphene sheet 118 may include a direct thermal interface with the processing resource in the cylindrical housing interior to encourage thermal rejection. In addition, graphene sheet 118 may have a thermal interface with a portion of the outer surface of the electronic device at which higher skin temperatures are acceptable, such as the rear cover where a metal portion may act as an internal heat sink. Various types of thermal transfer may be used based upon anticipated thermal conditions at an electronic device interior. In one example embodiment, graphene sheet 118 may be disposed at the subassembly so that no contact is made between graphene sheet 118 and the outer housing.

Figure 6B:
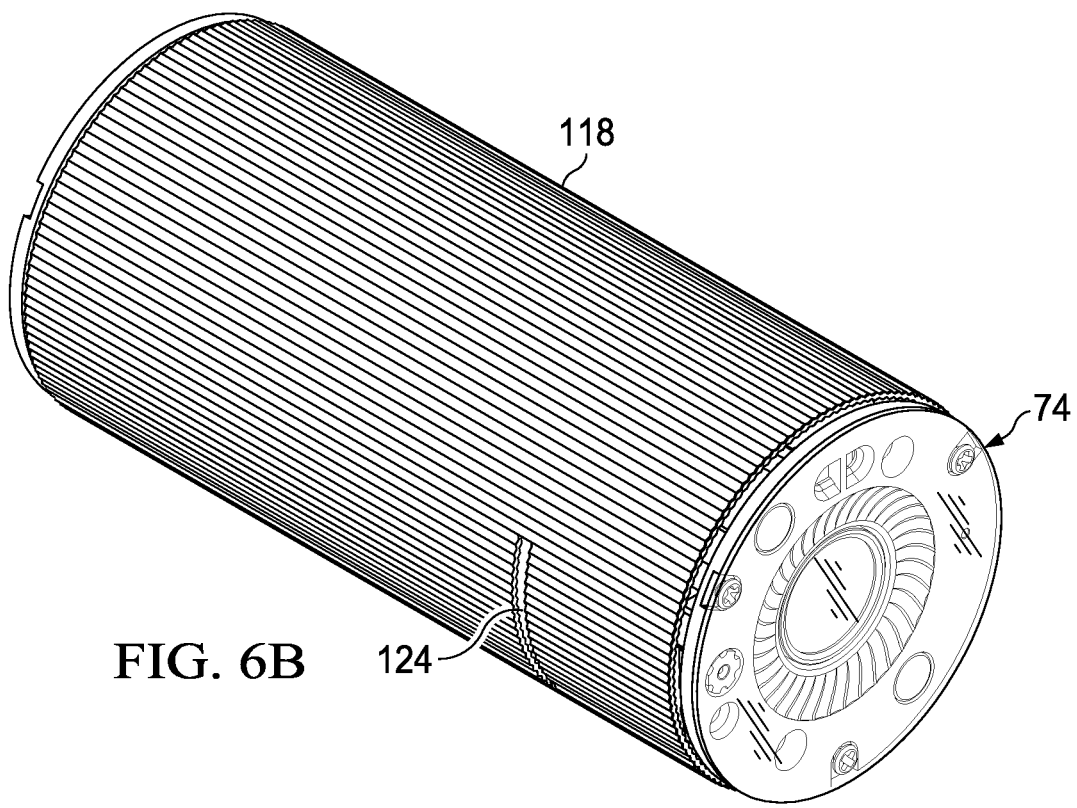
Figure 6C:
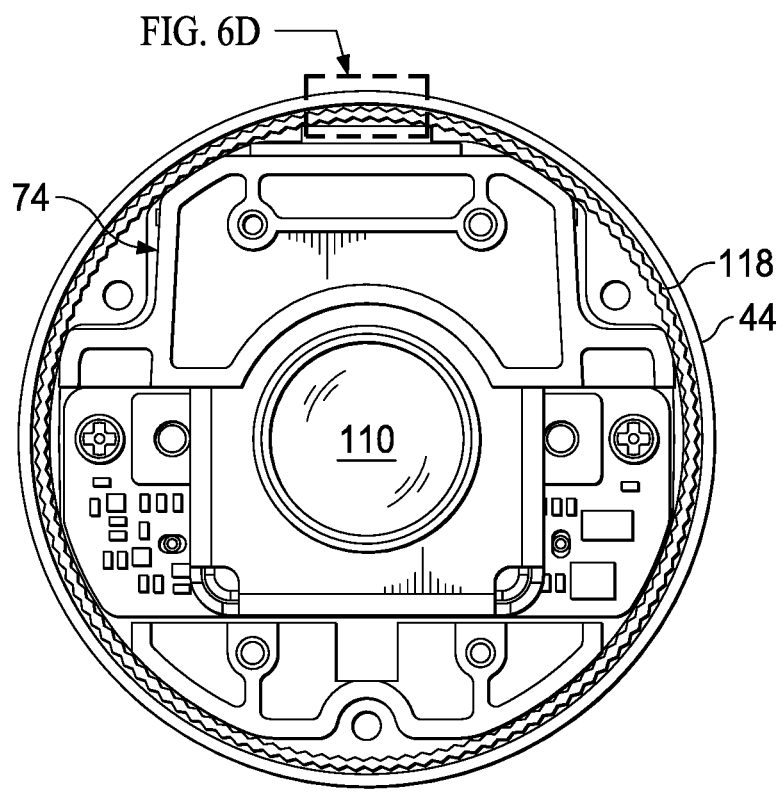
Figure 6D:
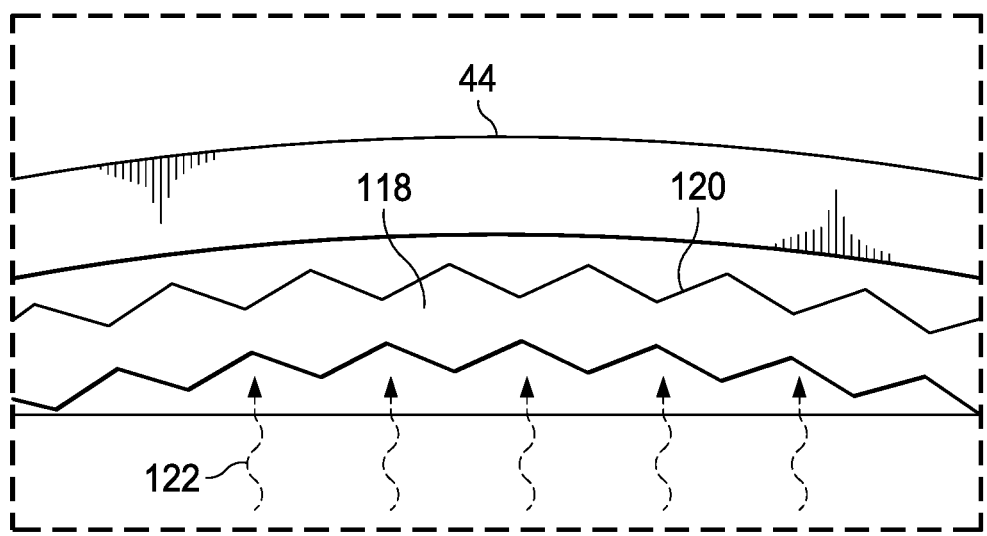

FIG. 6B depicts an example embodiment having graphene sheet 118 coupled to subassembly 74 to avoid contact with the outer housing. In the example embodiment, a rib slot 124 is cut in the graphene sheet to fit over ribs of the subassembly so that contact with the external housing is avoided. FIG. 6C depicts a front sectional view of the camera module 110 having graphene sheet 118 disposed between cylindrical housing 44 and subassembly 74 to act as a thermal barrier that reduces thermal transfer from processing resources within subassembly 74 to the exterior surface of cylindrical housing 44. In the example embodiment, graphene sheet 118 defines an air gap with cylindrical housing 44 to reduce thermal transfer. FIG. 6D depicts an example of graphene sheet 118 having a double-sided corrugated pattern 120 surface and defining an air gap with cylindrical housing 44. In an embodiment that transfers thermal energy 122 from the processing resource to the rear cover, a strip of graphene material may extend from the graphene sheet 118 to contact the processing resource or a heat sink coupled to the processing resource. Similarly, at the rear side of cylindrical housing 44 a strip of graphene may extend out and contact the rear cover at a metallic portion. Additional heat sink structures may be added to aid in rejection of excess thermal area at portions of the rear cover protected from touch by an end user, such as with venting through the rear side. As is described above, where thermal energy is not expected to exceed operating constraints within the housing, complete separation of graphene sheet 118 from the housing may be desired so that energy transfer to the cylindrical housing in minimized.

Although the present invention has been described in detail, it should be understood that various changes, substitutions and alterations can be made hereto without departing from the spirit and scope of the invention as defined by the appended claims.

What is claimed is:

1. A camera comprising:
    a cylindrical housing having open front and rear faces;
    a camera module operable to capture visual images;
    a subassembly configured to secure the camera module and slide into the cylindrical housing to hold the camera module in the cylindrical housing at a fixed orientation;
    processing components coupled to the subassembly and interfaced with the camera module, the processing components processing the visual information and generating thermal energy as a byproduct of the processing; and
    a graphene sheet formed as a cylinder and disposed around the subassembly.

2. The camera of claim 1 wherein the graphene sheet has a corrugated pattern at an inner surface.

3. The camera of claim 2 wherein the graphene sheet has a corrugated pattern at an outer surface.

4. The camera of claim 1 further comprising:
a rear cover coupled to a rear side of the cylindrical housing; and
a bezel coupled to a front side of the cylindrical housing, the bezel having an opening aligned with the camera module.

5. The camera of claim 4 wherein the graphene sheet is disposed free of contact with the rear cover and the bezel.

6. The camera of claim 4 wherein the graphene sheet thermally couples with the rear cover.

7. The camera of claim 1 further comprising:
plural ribs formed in the subassembly to support the subassembly by contact against an interior of the cylindrical housing;
wherein the graphene sheet has slot openings aligned with one or more of the plural ribs.

8. The camera of claim 1 wherein the graphene sheet is held in a spaced relationship relative to an interior of the cylindrical housing.

9. The camera of claim 1 wherein the processing components include an artificial intelligence processor operable to process the visual images.

10. A method for assembly of a camera, the method comprising:
extruding a cylinder having an interior;
assembling a camera module and processing resource into a subassembly;
coupling a graphene sheet around the subassembly;
sliding the subassembly into the cylinder; and
interceding with the graphene sheet of thermal energy transfer from the processing resource to the housing.

11. The method of claim 10 further comprising:
corrugating an inner surface of the graphene sheet; and
coupling the inner surface towards the subassembly in a cylinder shape around the subassembly.

12. The method of claim 10 further comprising:
corrugating an inner and outer surface of the graphene sheet; and
defining an air gap between the graphene sheet and cylinder inner surface with the subassembly slid into the cylinder.

13. The method of claim 11 further comprising:
coupling a rear cover to a rear side of the cylinder opposite the camera module; and
coupling a bezel to a front side of the cylinder proximate the camera module, the bezel having an opening aligned with the camera module.

14. The method of claim 13 further comprising disposing the graphene sheet within the cylinder without the graphene sheet contacting the cylinder, the rear cover and the bezel.

15. The method of claim 13 further comprising disposing the graphene sheet within the cylinder in contact with the rear cover and without contacting the cylinder and bezel.

16. The method of claim 10 further comprising:
supporting the subassembly with ribs of the subassembly engaged against the cylinder interior; and
disposing slots formed in the graphene sheet at the ribs to separate the graphene sheet from the cylinder interior.

17. An electronic device housing comprising:
an extruded aluminum cylinder having open front and rear faces;
a subassembly configured to slide into the extruded aluminum cylinder supported against an interior surface of the aluminum extruded cylinder, the subassembly further configured to couple to processing resources, the subassembly having ribs that engage against the extruded aluminum cylinder; and
a graphene sheet disposed as a cylinder around the subassembly to accept thermal energy released by the processing resources, the graphene sheet having slots formed at the ribs to fit around the subassembly.

18. The electronic device housing of claim 17 wherein the graphene sheet has a corrugated surface.

19. The electronic device housing of claim 17 wherein the graphene sheet is disposed to maintain an air gap with the extruded aluminum cylinder.

20. The electronic device housing of claim 17 further comprising a rear cover coupled to the rear face of the extruded aluminum cylinder, the graphene sheet in contact with the rear cover.

\* \* \* \* \*